United States Patent [19]

Bender et al.

[11] Patent Number: 4,956,464

[45] Date of Patent: Sep. 11, 1990

[54] PREPARATION OF DIHYDROQUINACRIDONES, QUINACRIDONES AND QUINACRIDONEQUINONES

[75] Inventors: Herbert Bender, Boehl-Iggelheim; Horst Colberg, Ludwigshafen; Friedhelm Teich, Karlsruhe; Reinhard Kemper, Heidelberg, all of Fed. Rep. of Germany

[73] Assignee: BASF Aktiengesellschaft, Ludwigshafen, Fed. Rep. of Germany

[21] Appl. No.: 263,355

[22] Filed: Oct. 27, 1988

[30] Foreign Application Priority Data

Oct. 27, 1987 [DE] Fed. Rep. of Germany ....... 3736261
Apr. 22, 1988 [DE] Fed. Rep. of Germany ....... 3813625

[51] Int. Cl.$^5$ .............................................. C09B 48/00
[52] U.S. Cl. ....................................... 546/57; 546/49; 546/56
[58] Field of Search ............................. 546/49, 57, 56

[56] References Cited

U.S. PATENT DOCUMENTS

| 2,460,538 | 2/1949 | Schneider | 236/45 |
| 2,821,529 | 1/1958 | Struve | 546/49 |
| 3,107,248 | 10/1963 | Cooper | 546/49 |
| 3,133,071 | 5/1964 | Nelson | 546/49 |
| 3,907,805 | 9/1975 | Lin | 546/49 |
| 4,017,496 | 4/1977 | Hanke | 546/49 |

FOREIGN PATENT DOCUMENTS

| 57-40562 | 3/1982 | Japan . | |
| 0057749 | 4/1982 | Japan | 546/49 |

Primary Examiner—Diana G. Rivers
Attorney, Agent, or Firm—Oblon, Spivak, McClelland, Maier & Neustadt

[57] ABSTRACT

Dihydroquinacridones, quinacridones and quinacridonequinones are prepared by cyclizing 2,5-dianilino-3,6-dihydroterephthalic acid derivatives or 2,5-dianilinoterephthalic acid derivatives in the liquid or solid state or in solution, in each case in finely divided form, or in the gas phase, in the presence or absence of an oxidizing agent.

7 Claims, No Drawings

PREPARATION OF DIHYDROQUINACRIDONES, QUINACRIDONES AND QUINACRIDONEQUINONES

The present invention relates to a novel process for preparing dihydroquinacridones, quinacridones and quinacridonequinones by cyclizing 2,5-dianilino-3,6-dihydroterephthalic acid derivatives or 2,5-dianilinoterephthalic acid derivatives in the liquid or solid state or as a solution, in each case in a finely divided form, or in the gas phase.

US-A-2,821,529 teaches the cyclization of 2,5-dianilino-3,6-dihydroterephthalic esters or ring-substituted derivatives thereof to dihydroquinacridones. The reaction takes place at about 250° C. with stirring in solution, the solvent used being a biphenyl/diphenyl oxide mixture. The reaction takes a very long time, namely 60 or 90 minutes. In a followup reaction, the hydroquinacridone formed is oxidized in solution by refluxing with nitrobenzenesulfonic acid as a oxidizing agent to give quinacridone.

US-A-3,907,805 discloses the preparation of quinacridone by thermal dehydrogenation of dihydroquinacridone in the gas phase at from 600° to 660° C. The preparation of the dihydroquinacridone used as a starting material, however, is not dealt with in this context.

The preparation of dihydroquinacridone is also described in JP-A-40,562/1975. The cyclization of a 3-alkoxycarbonyl-2-anilino-1,4-dihydroacridan-9-one at from 260° to 300° C. in the gas phase in a fixed bed, fluidized bed or spray reactor gives dihydroquinacridone in the course of contact times ranging from 2 to 30 minutes. The acridanone used here as a starting compound is prepared by cyclizing a 2,5-dianilino-3,6-dihydroterephthalic ester in solution.

It is an object of the present invention to provide a process whereby 2,5-dianilino-3,6-dihydroterephthalic acid compounds or 2,5-dianilinoterephthalic acid compounds are directly convertible in a simple manner into dihydroquinacridones, quinacridones or quinacridonequinones.

We have found that this object is achieved with a process for preparing a dihydroquinacridone of the formula I

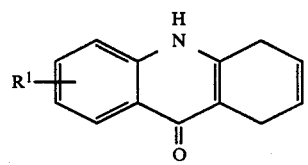

(I)

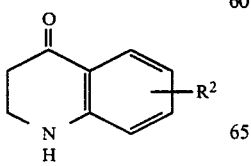

a quinacridone of the formula II

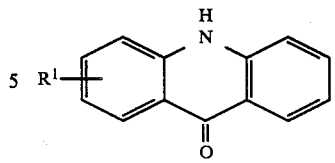

(II)

a quinacridonequinone of the formula III

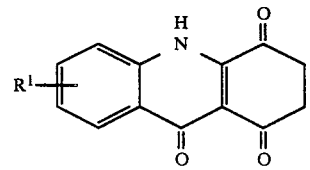

(III)

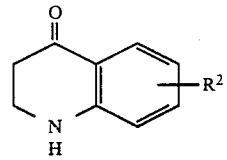

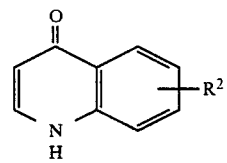

or a mixture thereof, with $R^1$ and $R^2$ in the formulae I, II and III being identical or different, each being independently of the other hydrogen, chlorine, bromine, $C_1$–$C_{10}$-alkoxy, $C_1$–$C_{10}$-alkyl or substituted or unsubstituted phenyl, which is effected with advantage when (a) to prepare a dihydroquinacridone of the abovementioned formula I a 2,5-dianilino-3,6-dihydroterephthalic acid derivative of the formula IV

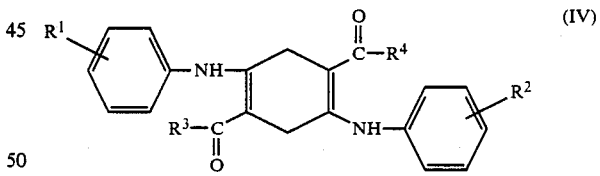

(IV)

where $R^1$ and $R^2$ each have the abovementioned meanings and $R^3$ and $R^4$ are identical or different and are each independently of the other $C_1$–$C_{10}$-alkoxy, amino, $C_1$–$C_{10}$-mono- or -dialkylamino or halogen, is cyclized in the liquid or solid state or in solution, in each case in a finely divided form, or in the gas phase at from 350° to 500° C., (b) to prepare a quinacridone of the abovementioned formula II a 2,5-dianilino-3,6-dihydroterephthalic acid derivative of the abovementioned formula IV is cyclized and dehydrogenated in the liquid or solid state or in solution, in each case in a finely divided form, at from 400° to 700° C. or a 2,5-dianilinoterephthalic acid derivative of the formula V

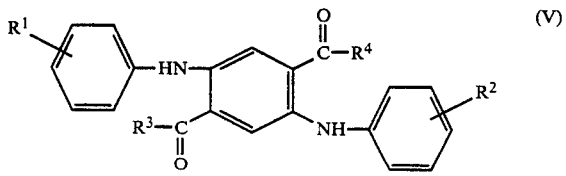

(V)

where $R^1$, $R^2$, $R^3$ and $R^4$ each have the abovementioned meanings, is cyclized in the liquid or solid state or in solution, in each case in a finely divided form, or in the gas phase at from 300° to 700° C. and (c) to prepare a quinacridonequinone of the abovementioned formula III a 2,5-dianilino-3,6-dihydroterephthalic acid derivative of the abovementioned formula IV or a 2,5-dianilinoterephthalic acid derivative of the abovementioned formula V is cyclized in the liquid or solid state or in solution, in each case in a finely divided form, or in the gas phase at from 300° to 700° C. in the presence of an oxidizing agent.

$R^1$, $R^2$, $R^3$ and $R^4$ in the formulae I to V are each for example methoxy, ethoxy, propoxy, isopropoxy, butoxy, isobutoxy, sec-butoxy, pentyloxy, isopentyloxy, neopentyloxy, hexyloxy, isohexyloxy, heptyloxy, octyloxy, 2-ethylhexyloxy, nonyloxy or decyloxy.

$R^1$ and $R^2$ in the formulae I to V are each also for example methyl, ethyl, propyl, isopropyl, butyl, isobutyl, sec-butyl, pentyl, isopentyl, neopentyl, hexyl, isohexyl, heptyl, octyl, 2-ethylhexyl, nonyl, decyl, phenyl or phenyl which is substituted, for example by $C_1$-$C_4$-alkyl, $C_1$-$C_4$-alkoxy or halogen, in particular chlorine or bromine, such as 4-methylphenyl, 2,4- or 2,6-dimethylphenyl, 2-ethylphenyl, 4-ethylphenyl, 4-propylphenyl, 4-isopropylphenyl, 4-butylphenyl, 2-methoxyphenyl, 4-methoxyphenyl, 4-ethoxyphenyl, 4-propoxyphenyl, 4-butoxyphenyl, 2-chlorophenyl, 4-chlorophenyl, 2,4- or 2,6-dichlorophenyl, 4-bromophenyl or 2-methyl-4-chlorophenyl.

$R^3$ and $R^4$ in the formulae IV and V are each also for example mono- or dimethylamino, mono- or diethylamino, mono- or diprooylamino, mono- or diisopropylamino, mono- or dibutylamino, mono- or dipentylamino, mono- or dihexylamino, mono- or diheptylamino, mono- or dioctylamino, mono- or di(2-ethylhexyl)amino, mono- or dinonylamino, mono- or didecylamino, N-methyl-N-ethylamino, fluorine, chlorine or bromine.

Preferably, the process according to the invention is carried out with a 2,5-dianilino-3,6-dihydroterephthalic acid derivative of the formula IV or a 2,5-dianilinoterephthalic acid derivative of the formula V where $R^3$ and $R^4$ are each $C_1$-$C_{10}$-alkoxy.

A preferred procedure comprises performing in reaction (a) the cyclization at from 350° to 450° C.

A further preferred procedure comprises performing in reaction (b) the cyclization and dehydrogenation of the 2,5-dianilino-3,6-dihydroterephthalic acid derivative at from 450° to 650° C.

A further preferred procedure comprises performing in reaction (b) the cyclization of the 2,5-dianilinoterephthalic acid derivative at from 350° to 550° C.

A further preferred procedure comprises performing in reaction (c) the cyclization at from 400° to 650° C.

Although it is possible to raise the cyclization temperature above the values mentioned, this does not produce any further benefits.

The process according to the invention can be carried out in any flowthrough apparatus. It is advantageous to use for example a fluidized bed or fixed bed reactor, the use of tubular or spray reactors being preferred. It is particularly preferred to carry out the process according to the invention in an empty tubular reactor.

If the process according to the invention is carried out in a fluidized bed reactor, the fluidizable material can comprise not only inert solids, for example silica gel, but also catalytically active solids. Such catalysts are for example activated carbons, cokes, argillaceous earths, aluminas or zeolites. The argillaceous earths and aluminas may also have been doped with alkali metal oxides, alkaline earth metal oxides or with oxides of metals of group 8 of the periodic table of the elements.

Reaction (c), where a dihydroterephthalic acid derivative IV or a terephthalic acid derivative V is cyclized to give a quinacridonequinone derivative III, is carried out in the presence of an oxidizing agent. This oxidizing agent can be for example oxygen, hydrogen peroxide, an alkali metal iodate or an alkali metal permanganate. Preference is given to using oxygen in the form of air.

Per mole of species to be cyclized (IV or V) here from 0.5 to 100 moles, preferably from 5 to 50 moles, of an oxidizing agent are used.

As mentioned above, we have also found that the presence of an oxidizing agent has no adverse effect on the cyclization of dihydroterephthalic acid derivatives III to dihydroquinacridones I or quinacridones II. This is surprising because from above-cited US-A-2,821,529, which describes the cyclization of dihydroterephthalic acid derivatives to dihydroquinacridones in a solvent, it is known that this reaction step has to take place in the absence of oxygen.

In some cases, on the contrary, it can be of advantage to carry out the cyclizing steps IV→>I and IV→>II in the presence of an oxidizing agent, in particular oxygen in the form of air. Per equivalent of species IV to be cyclized, from 1 to 100 equivalents of an oxidizing agent are used in this case.

The process according to the invention can be operated not only continuously but also batchwise.

The novel process is advantageously carried out by feeding the starting material IV or V in the solid or liquid state, in solution or in the gas phase into the reaction zone. If the cyclization takes place in a fluidized bed reactor, it is possible to meter the starting material either directly into the fluidized bed or into the gas space above.

The crucial requirement is that the starting material, when charged in the liquid or solid state or in solution, is present in the reaction zone in a finely divided form.

This is achieved for example by first treating the starting material, if it is supplied in the solid form, in a mill and then trickling it via suitable conveying apparatus into the reaction zone. It is also possible to meter a suspension of the starting material, produced for example in a disperser, into the reaction zone.

If the starting material is supplied in the liquid state or in the form of a solution, it can be sprayed into the reaction zone.

Suitable diluents and solvents are for example water, N,N-dimethylformamide, N-methylpyrrolidinone, $C_1$-$C_6$-alkanols, toluene, xylene, methylnaphthalene and acetone.

If the starting material is to be reacted in the gas phase, it is advantageously vaporized before entry into the reaction zone.

It is of course also possible for the starting material to be simultaneously present in the liquid and solid state, in solution and in the gas phase.

It is in each case also possible to suck the starting material into the reaction zone by producing a pressure gradient.

The starting material can in all cases also be supplied in the presence of a gas stream.

Carrier gases which come into consideration are gases which are inert under the reaction conditions, such as noble gases, carbon dioxide, nitrogen or vaporized inert normally liquid diluents, for example acetone, N,N-dimethylformamide, benzene, methylnaphthalene or mixtures thereof. However, it is also possible to use air as a constituent of the carrier gas.

In the process according to the invention, there is always a slow gas stream present, irrespective of whether the abovementioned gas stream is employed. The former gas stream comprises eliminated hydrogen and/or the eliminated components $R^3H$ and $R^4H$, where $R^3$ and $R^4$ each have the abovementioned meanings. This is because these components are inevitably formed in the course of the cyclization of the corresponding starting materials IV and V.

Preference is given to a procedure where, using a tubular or spray reactor, an aqueous suspension of starting material IV or V is introduced into the reaction space directly by spraying or as a fine mist injected together with a carrier gas.

If starting material IV or V is charged into the reaction zone in the form of a suspension, it is advantageous to vaporize the diluent immediately upstream of the reaction zone. This can be done advantageously by means of radiated energy, for example by using a glowing pipe, or, in the case of polar solvents, by means of microwaves.

Similarly, the energy requirements of the process according to the invention can advantageously be met with radiated energy, for example microwaves or in particular by using a red-hot pipe. Furthermore, the energy can for example also be supplied with a hot gas stream or with a plasma.

The residence time of the reaction mixture in the reactor in the case of reaction (a) is in general from 0.1 to 5 seconds, preferably from 0.1 to 1 second, in particular 0.5 seconds, in the case of reaction (b) in general from 0.1 to 10 seconds, preferably from 1 to 5 seconds, in particular 1 second (for dihydroterephthalic acid derivatives IV) or from 0.1 to 5 seconds, preferably from 0.1 to 1 second, in particular 0.5 seconds (for terephthalic acid derivatives V), and in the case of reaction (c) from 0.5 to 10 seconds, preferably from 1 to 5 seconds, in particular 3 seconds.

By varying the reaction temperature within the range according to the invention and by varying the residence time of the reaction mixture in the reactor it is possible to prepare each of target products I, II and III in pure form or, alternatively, in mixed form.

The target products are separated off in a conventional manner, for example by means of cyclones, by employing wet collection and cold traps, by means of mechanical and electric gas filters or by a combination of these measures. However, it is also possible to employ the selective desublimation method known from US-A-2,460,538.

The advantage of the novel process is that, starting from dihydroterephthalic acid derivatives IV or terephthalic acid derivatives V, the target products are obtained directly in a single stage in an extremely short reaction time. Nor are solvents required in the process according to the invention (except where the starting materials are supplied in solution or suspension), while in existing processes the presence of solvents is a requirement and, since most processes have more than one stage, it is frequently necessary to employ different solvents for the individual steps.

The dihydroquinacridone derivatives I obtainable by means of the process according to the invention are useful intermediates for the synthesis of pigments. Quinacridone derivatives II and quinacridonequinone derivatives III are pigments.

The following Examples illustrate the invention in more detail:

EXAMPLE 1

A suspension of 250 g of diethyl 2,5-dianilino-3,6-dihydroterephthalate in 1 l of water was metered at 650° C. in the course of 1 hour in a nitrogen stream (1.5 m$^3$) through a one-material nozzle into a tubular reactor (50 mm in diameter, 300 mm in length) in a axial direction. Using a wet collector, 183 g of quinacridone were isolated.

EXAMPLE 2

200 g of finely ground dipropyl 2,5-dianilino-3,6-dihydroterephthalate were passed by brush metering (gas stream: 2 m$^3$/h of nitrogen and 0.5 m$^3$/h of air) through a tubular reactor (40 mm in diameter, 750 mm in length) at 575° C. in the course of an hour. Using a wet collector, 130 g of pure quinacridone were isolated.

EXAMPLE 3

150 g of finely ground dibutyl 2,5-dianilino-3,6-dihydroterephthalate (particle size: 1–100 μm) were trickled by solid substance metering through a reactor (40 mm in diameter, 1500 mm in length) at 620° C. in the course of 1 hour. 80 g of a red solid were isolated, comprising according to HPLC a 1:1 mixture of dihydroquinacridone and quinacridone.

EXAMPLE 4

A melt of 350 g of diisobutyl 2,5-dianilino-3,6-dihydroterephthalate was sprayed by means of a one-material nozzle into the apparatus described in Example 1 in the course of 1 hour while the reactor was electrically heated to a red glow. In the gas space, a temperature of 650° C. was measured with a thermocouple. Using a gas filter, 213 g of crude quinacridone were obtained 95% pure.

EXAMPLE 5

An aqueous suspension of 100 g of finely ground dimethyl 2,5-dianilino-3,6-dihydroterephthalate in 500 ml of water was nozzled in a gas stream of 10 m$^3$/h of nitrogen and 2 m$^3$/h of air, which had been preheated to a temperature of 850° C., into a laboratory spray dryer in the course of 1 hour. Using a Venturi washer, 72 g of pure quinacridone were obtained.

EXAMPLE 6

A fluidized bed reactor (60 mm in diameter, 1,000 mm in length) containing alumina from 0.2 to 0.4 mm in particle size was charged per hour at 550° C. with a metered solution of 100 g of dimethyl 2,5-dianilino-3,6-dihydroterephthalate dissolved in 300 ml of methylnaphthalene. The fluidizing gas used was 300 l/h of nitrogen and 50 l/h of air each preheated to 500° C. The reaction product was separated off by means of a cyclone and a subsequent wash with water, giving 60 g of a red solid per hour comprising, according to UV spectroscopy and X-ray analysis, 96% pure quinacridone.

Examples 2 to 4 listed in Table 1 were carried out in a similar manner.

The starting material used was a dihydroterephthalic acid derivative of the formula

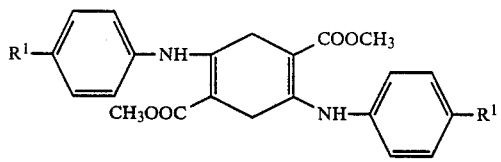

TABLE 1

| Example No. | R¹  | Temperature [°C.] | Yield [g/h] | Purity [%] |
|---|---|---|---|---|
| 7 | CH₃ | 570 | 75 | 98 |
| 8 | Cl  | 550 | 82 | 93 |
| 9 | H   | 525 | 68 | 85 |

EXAMPLE 10

Per hour, 125 g of dimethyl 2,5-dianilino-3,6-dihydroterephthalate, dissolved in 350 ml of N-methylpyrrolidone, were vaporized in a fluidized bed vaporizer (50 mm in diameter, 600 ml in length, containing silica gel as fluidizable material) in a stream of nitrogen (100 l/h) and passed at 480° C. continuously over a fixed bed (60 mm in diameter, 300 mm in length) of argillaceous earth extrudates. Workup and characterization were carried out as described in Example 6. 71 g of product, 80% quinacridone and 20% dihydroquinacridone, were isolated per hour.

EXAMPLE 11

Using a Venturi nozzle, per hour a solution of 300 g of dimethyl 2,5-dianilino-3,6-dihydroterephthalate and 400 ml of N,N-dimethylformamide was nozzled into a preheated gas stream of nitrogen (1.2 m³/h) and air (300 l/h) at 500° C. This gas-liquid mixture was introduced tangentially into a tubular reactor (50 mm in diameter, 400 mm in length) at 575° C. A conventional workup gave 224 g of crude quinacridone per hour of 98% purity (according to UV).

EXAMPLE 12

A suspension of 400 g of dimethyl 2,5-dianilino-3,6-dihydroterephthalate and 1 l of water was introduced by means of a two-material nozzle and 1.5 m³ of nitrogen into a tubular reactor at 590° C. In addition, a gas mixture of 400 l of air and 600 l of nitrogen was passed in at the side. 300 g of quinacridone having a purity of 97% were obtained.

EXAMPLE 13

Similarly to Example 6, 100 g of diethyl 2,5-dianilino-3,6-dihydroterephthalate were reacted at 425° C. per hour. The fluidizing gas used was nitrogen (400 l/h). A similar workup gave 58 g of dihydroquinacridone per hour.

EXAMPLE 14

In the apparatus described in Example 12, 400 g of dimethyl 2,5-dianilino-3,6-dihydroterephthalate at 680° C. were nozzled using a gas stream of 1 m³ of nitrogen and 1 m³ of air. 310 g of quinacridonequinone having a purity of 90% were isolated.

EXAMPLE 15

In the apparatus described in Example 12, 300 g of dimethyl 2,5-dianilinoterephthalate were nozzled per hour at 475° C. using 1 m³/h of nitrogen. Using air filters, 250 g of quinacridone of high purity were isolated per hour.

EXAMPLE 16

In the apparatus described in Example 11, a solution of 200 g of diethyl 2,5-dianilinoterephthalate in 1 l of N-methylpyrrolidone was reacted per hour at 475° C. in a stream of nitrogen (1 m³/h) 150 g of quinacridone having a UV purity of 90% were isolated per hour on an air filter.

EXAMPLE 17

100 g of dimethyl 2,5-dianilino-3,6-dihydroterephthalate, dissolved in 250 ml of N-methylpyrrolidone, were vaporized per hour in a 100 l/h nitrogen stream. This gas stream was passed at 375° C. over a fixed bed (50 mm in diameter, 500 mm in length, fluidizable material comprising alumina extrudates doped with copper oxide). Using wet quenching and solids filters, 80 g of a red solid were isolated per hour, comprising pure dihydroquinacridone according to UV and X-ray analysis.

EXAMPLE 18

A suspension of 200 g of dimethyl 2,5-dianilino-3,6-dihydroterephthalate in 1 l of water was introduced by means of a two-material nozzle and 1.5 m³ of nitrogen into a tubular reactor (50 mm in diameter, 300 mm in length) at 395° C. Using a solids filter, 170 g of dihydroquinacridone (purity 95%, includes about 3% of quinacridone) were obtained.

The method of Example 18 was also adopted for Examples 19 to 24 given in Table 2. The starting material used was a dihydroterephthalic acid derivative of the formula

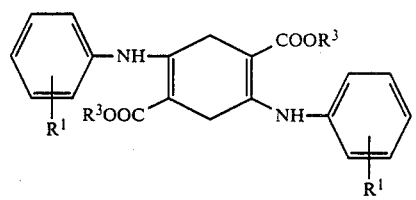

in each case the reaction product was the corresponding dihydroquinacridone.

TABLE 2

| Example No. | R¹ | R³ | Temperature [°C.] | Yield [g/h] | Purity [%] |
|---|---|---|---|---|---|
| 19 | 3-CH₃ | CH₃ | 330 | 75 | 85 |
| 20 | 4-CH₃ | CH₃ | 350 | 77 | 93 |
| 21 | 3-Cl  | CH₃ | 425 | 80 | 89 |
| 22 | 4-Cl  | CH₃ | 385 | 73 | 88 |
| 23 | 4-CH₃ | C₂H₅ | 390 | 71 | 96 |
| 24 | 4-Cl  | C₂H₅ | 400 | 70 | 91 |

We claim:

1. A process for preparing a dihydroquinacridone of the formula:

a quinacridone of the formula II:

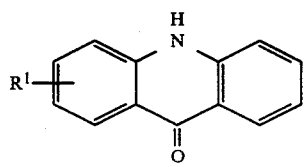

a quinacridonequinone of the formula III:

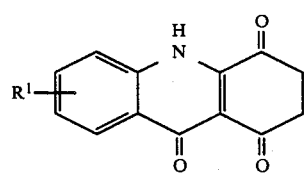

or a mixture thereof, wherein $R^1$ and $R^2$ in the formulae I, II and III are identical or different and each is independently of the other hydrogen, chlorine, bromine, $C_1$-$C_{10}$-alkoxy, $C_1$-$C_{10}$-alkyl or substituted or unsubstituted phenyl, wherein (a) to prepare a dihydroquninacridone of formula I, a 2,5-dianilino-3,6-dihydroterephthalic acid derivative of the formula IV

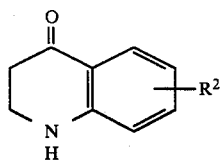

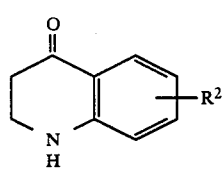

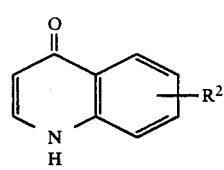

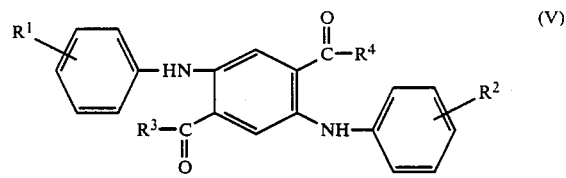

where $R^1$ and $R^2$ each have the above-mentioned meanings and $R^3$ and $R^4$ are identical or different and are each independently of the other $C_1$-$C_{10}$-alkoxy, amino, $C_1$-$C_{10}$-mono or -dialkylamino or halogen, is cyclized at a temperature of from 350° to 500° C. for a time of from 0.1 to 5 seconds in the liquid or solid state or in solution, in each case in a finely divided form, or in the gas phases, (b) to prepare a quinacridone of formula II, a 2,5-dianilino-3,6-dihydroterephthalic acid derivative of formula IV is cyclized and dehydrogenated at a temperature of from 400° to 700° for a time of from 1 to 5 seconds in the liquid or solid state or in solution, in each case in a finely divided form, or in the gas phase or a 2,5-dianilinoterephthalic acid derivative of the formula V where $R^1$, $R^2$, $R^3$ and $R^4$ each have the above-mentioned meanings, is cyclized at a temperature of from 350° to 550° C. for a time of from 0.1 to 5 seconds in the liquid or solid state or in solution, in each case in a finely divided form, or in the gas phase; and (c) to prepare a quinacridonequinone of formula III, a 2,5-dianilino-3,6-dihydroterephthalic acid derivative of formula IV or a 2,5-dianilinoterephthalic acid derivative of formula V is cyclized at a temperature of from 300° to 700° C. for a time of from 0.5 to 10 seconds in the liquid or solid state or in solution, in each case in a finely divided form, or in the gas phase in the presence of an oxidizing agent.

2. A process as claimed in claim 1, wherein $R^3$ and $R^4$ in the formulae IV and V are each $C_1$-$C_{10}$-alkoxy.

3. A process as claimed in claim 1, wherein the cyclization is carried out in an empty tubular reactor.

4. A process as claimed in claim 1, wherein in reaction (a) the cyclization is carried out at from 350° to 450° C.

5. A process as claimed in claim 1, wherein in reaction (b) the cyclization and dehydrogenation of the 2,5-dianilino-3,6-dihydroterephthalic acid derivative is carried out at from 450° to 650° C.

6. A process as claimed in claim 1, wherein in reaction (c) the cyclization is carried out at from 400° to 650° C.

7. A process as claimed in claim 1, wherein in reaction (c) the oxidizing agent used is air.

* * * * *